United States Patent
Ho

(10) Patent No.: US 7,207,673 B1
(45) Date of Patent: Apr. 24, 2007

(54) CAP-MOUNTED SUN GLASSES

(76) Inventor: Alex Ho, 6F-1, No. 348, Kuang Fu South Rd., Taipei (TW)

( * ) Notice: Subject to any disclaimer, the term of this patent is extended or adjusted under 35 U.S.C. 154(b) by 0 days.

(21) Appl. No.: 11/403,956

(22) Filed: Apr. 14, 2006

(51) Int. Cl.
*G02C 3/00* (2006.01)

(52) U.S. Cl. ............................. 351/155; 2/10

(58) Field of Classification Search ............... 351/41, 351/155, 158; 2/10, 12, 13, 15, 453
See application file for complete search history.

(56) References Cited

U.S. PATENT DOCUMENTS

2005/0160511 A1* 7/2005 Kim .............................. 2/10

* cited by examiner

*Primary Examiner*—Huy K. Mai
(74) *Attorney, Agent, or Firm*—Leong C. Lei

(57) ABSTRACT

A pair of cap-mounted sun glasses is provided, which contains a glasses member, two clipping members, and two joint members. The glasses member has seat elements on the top rim for receiving the spherical elements at an end of the joint members. The joint members therefore can rotate around their spherical elements. As such, after the pair of sun glasses is mounted below the brim of a cap, the glasses member can be flipped up or down manually. At the other end of the joint members, there is a bolt element for fitting inside the slot opening of the clipping member having a hook portion for clipping the edge of the brim. As such, the clipping member can be extended outward to fit on a wider brim or withdrawn inward to fit on a narrower brim.

3 Claims, 7 Drawing Sheets

CAP-MOUNTED SUN GLASSES

TECHNICAL FIELD OF THE INVENTION

The present invention generally relates to sun glasses, and more particularly to a pair of sun glasses having clipping members on the frame for mounting the pair of sun glasses below the brim of a cap.

DESCRIPTION OF THE PRIOR ART

Under bright sunshine, people usually wear hats or sun glasses or both to avoid the stabbing light to the eyes. However, the tinted lenses diminish the user's eyesight and the pair of sun glasses has to be put on or taken down frequently when the lighting condition changes, which is quite inconvenient.

Therefore, there are inventions being proposed to mount a pair of sun glasses below the hard brim of a baseball cap or a work cap. The pair of sun glasses can also be flipped up or down manually, depending on the lighting condition. Based on how the sun glasses are joined to the cap, there are two types of these cap-mounted sun glasses. For the first type, as taught by U.S. Pat. Nos. 2,467,448, 2,560,669, 2,648,091, and 1,709,765, the pair of sun glasses is fixedly attached to the brim of the cap using various constructions. The disadvantage of this category of approaches is that the user does not have the liberty to change the cap.

As such, for the second type of cap-mounted sun glasses, as taught by U.S. Pat. Nos. 5,692,234, 526,124, 377,364, 2,619,641, 2,481,960, and D367,873, the pair of sun glasses can be mounted below and removed from the brim of the cap using various mechanisms. Despite of the improvement in terms of flexibility, these approaches still suffer the disadvantage that their fitting mechanisms cannot be adapted to large varieties of cap styles for proper mounting and positioning.

SUMMARY OF THE INVENTION

Accordingly, a pair of improved cap-mounted sun glasses is provided herein. A major objective of the present invention is to have a pair of removable sun glasses whose clipping members can be adapted so that the pair of sun glasses can be mounted below the brims of different caps. Another objective of the present invention is to allow the glasses member to be flipped upward or downward manually based on the lighting condition.

To achieve the foregoing objectives, the present invention contains a glasses member, two clipping members, and two joint members. The glasses member has seat elements on the top rim for receiving the spherical elements at an end of the joint members. The joint members therefore can rotate around their spherical elements. As such, after the pair of sun glasses is mounted below a cap, the glasses member can be flipped up or down manually using the joint members as hinges. At the other end of the joint members, there is a bolt element for fitting inside the slot opening of the clipping member having a hook portion for clipping the edge of the brim. As such, the clipping member can be extended outward to fit on a larger brim or withdrawn inward to fit on a smaller brim.

The foregoing objectives and summary provide only a brief introduction to the present invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
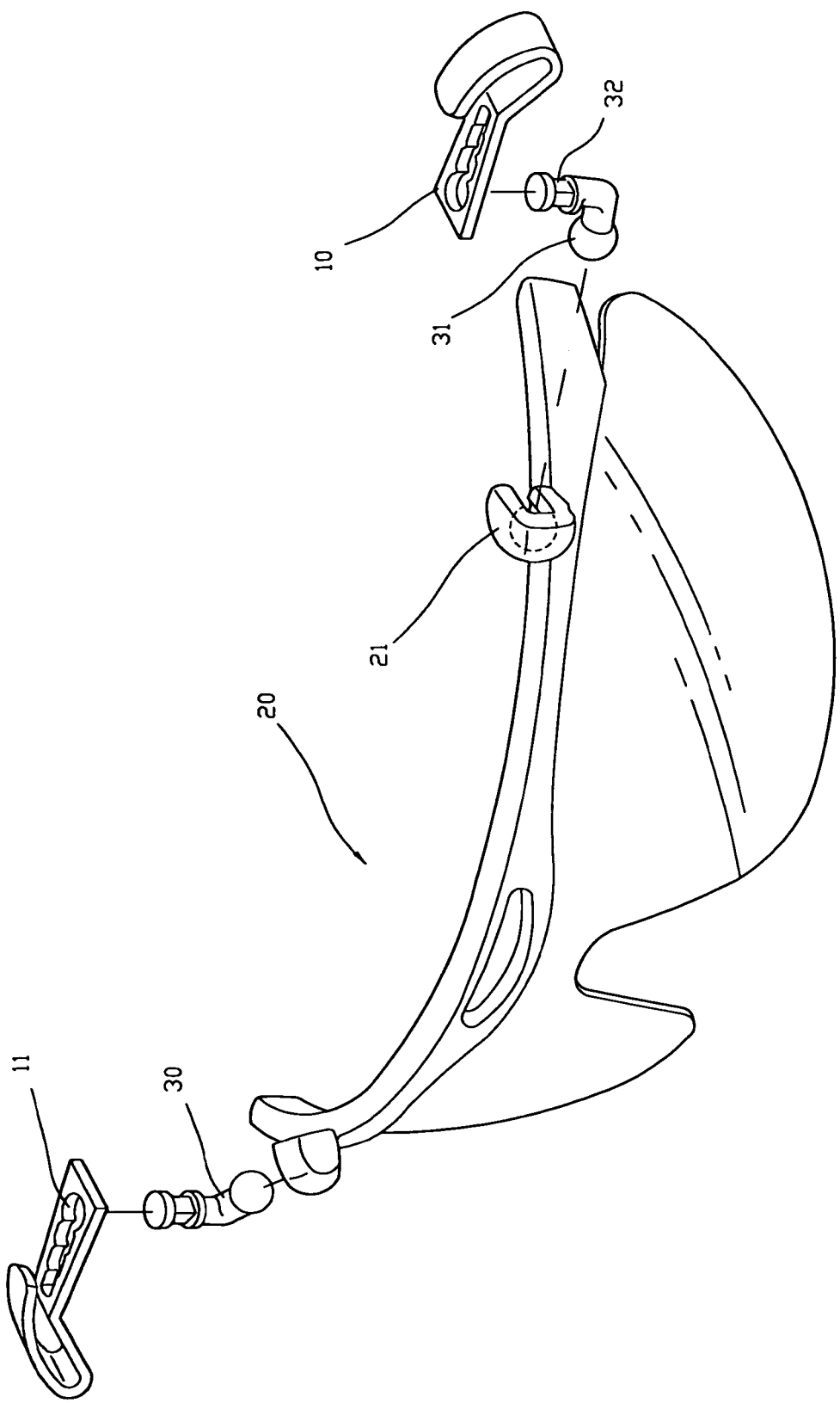
FIG. 1 is a perspective exploded view showing the sun glasses according to an embodiment of the present invention.
Figure 2:
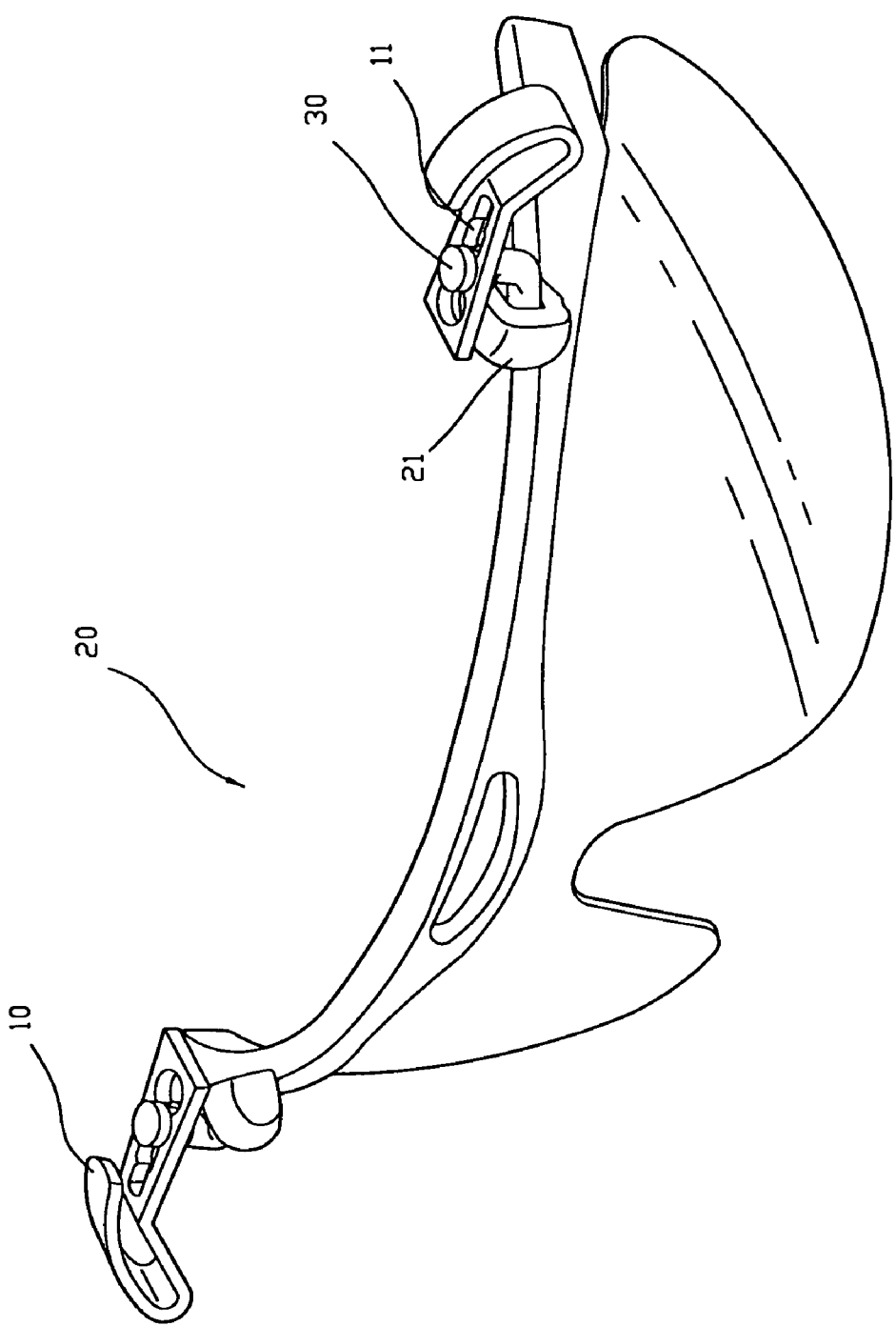
FIG. 2 is a perspective view showing the sun glasses of FIG. 1 after its assembly.
Figure 3:
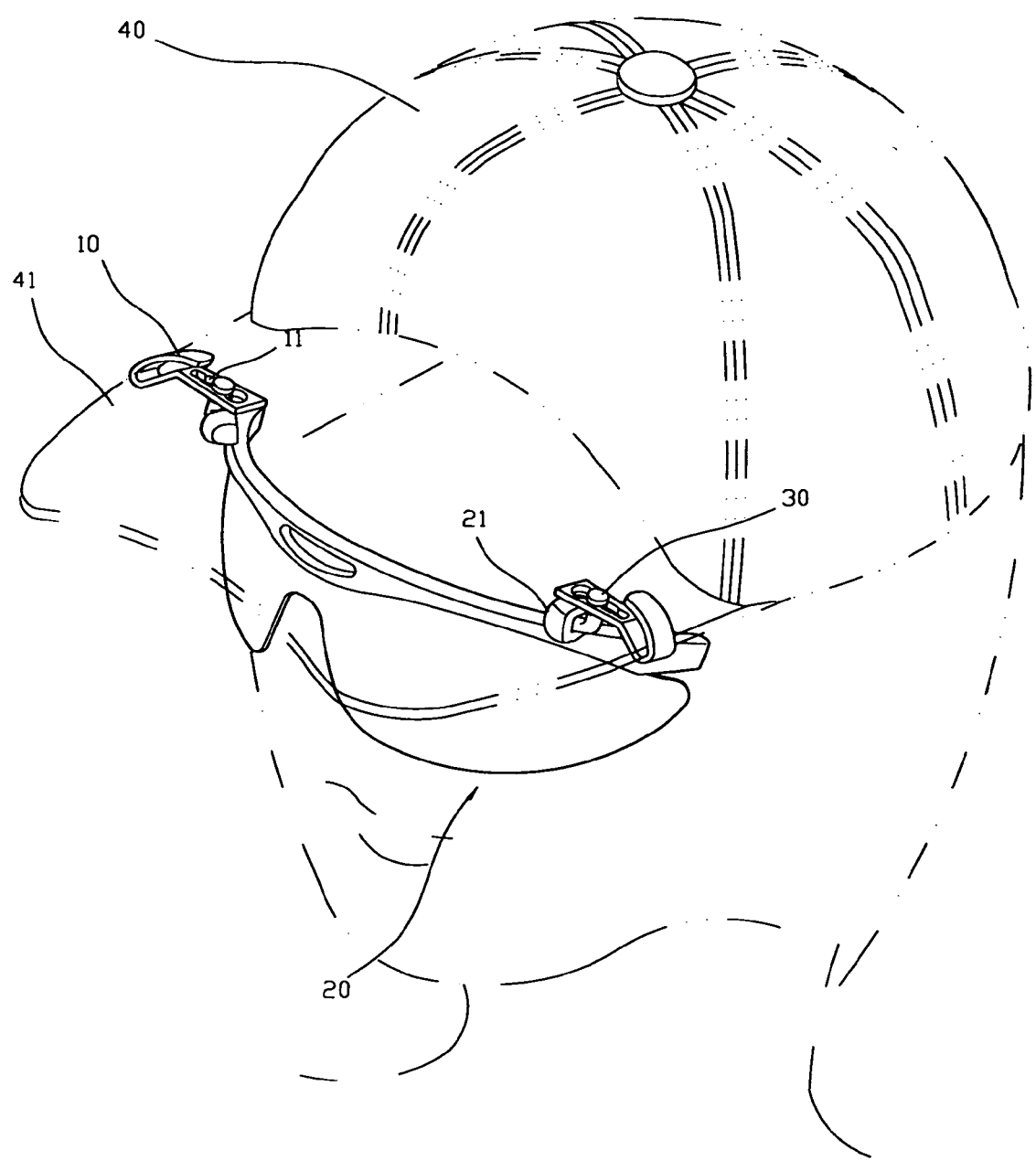
FIG. 3 is a perspective view showing the sun glasses of FIG. 1 mounting below the brim of a cap.

As illustrated in FIGS. 1 to 3, the sun glasses according to an embodiment of the present invention contains the glasses member 20, two clipping members 10, and two joint members 30.

Figure 4:
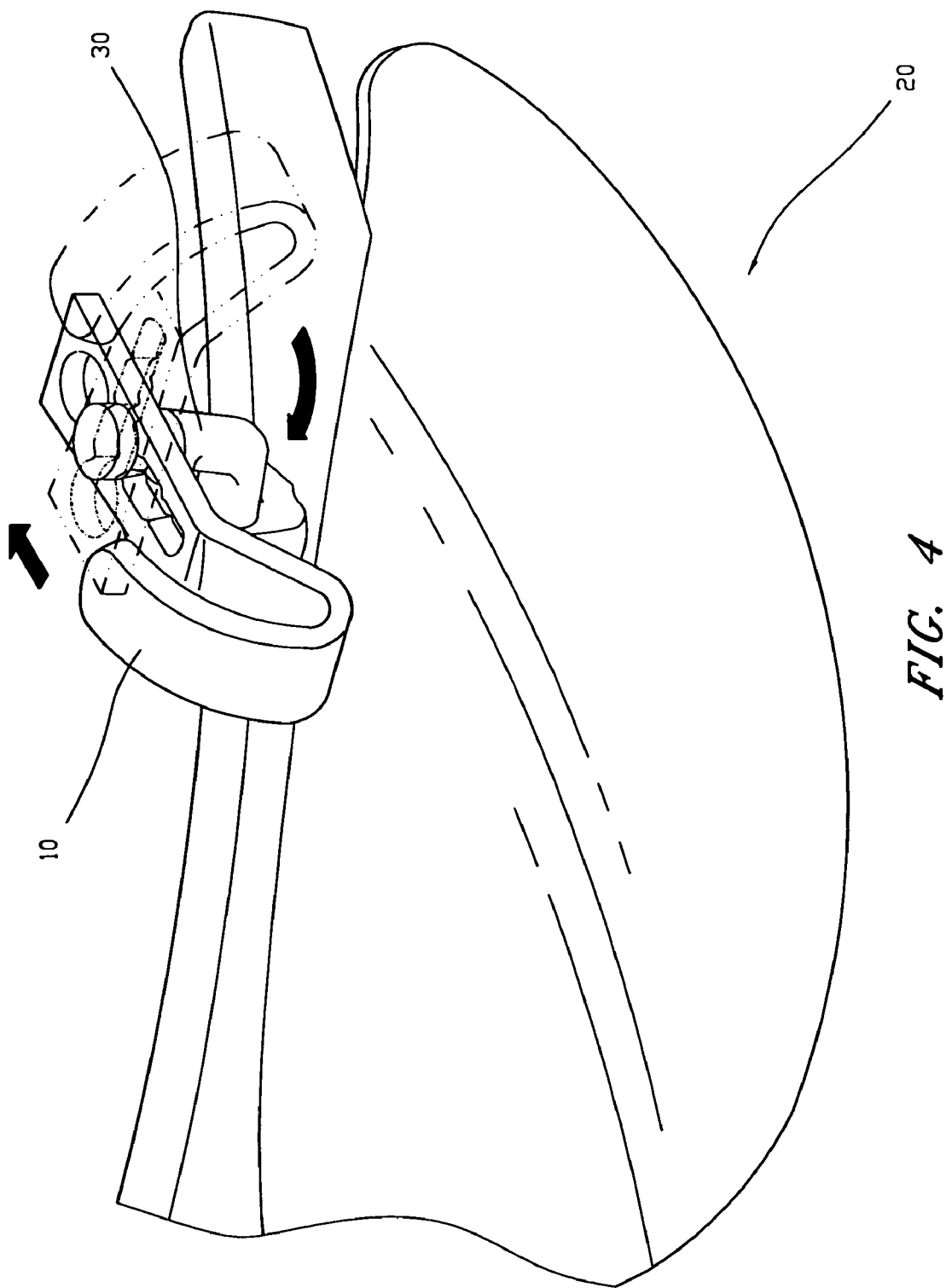
FIGS. 4 and 5 are perspective views showing the steps of adjusting the extension of the clipping member of FIG. 1.
Figure 5:
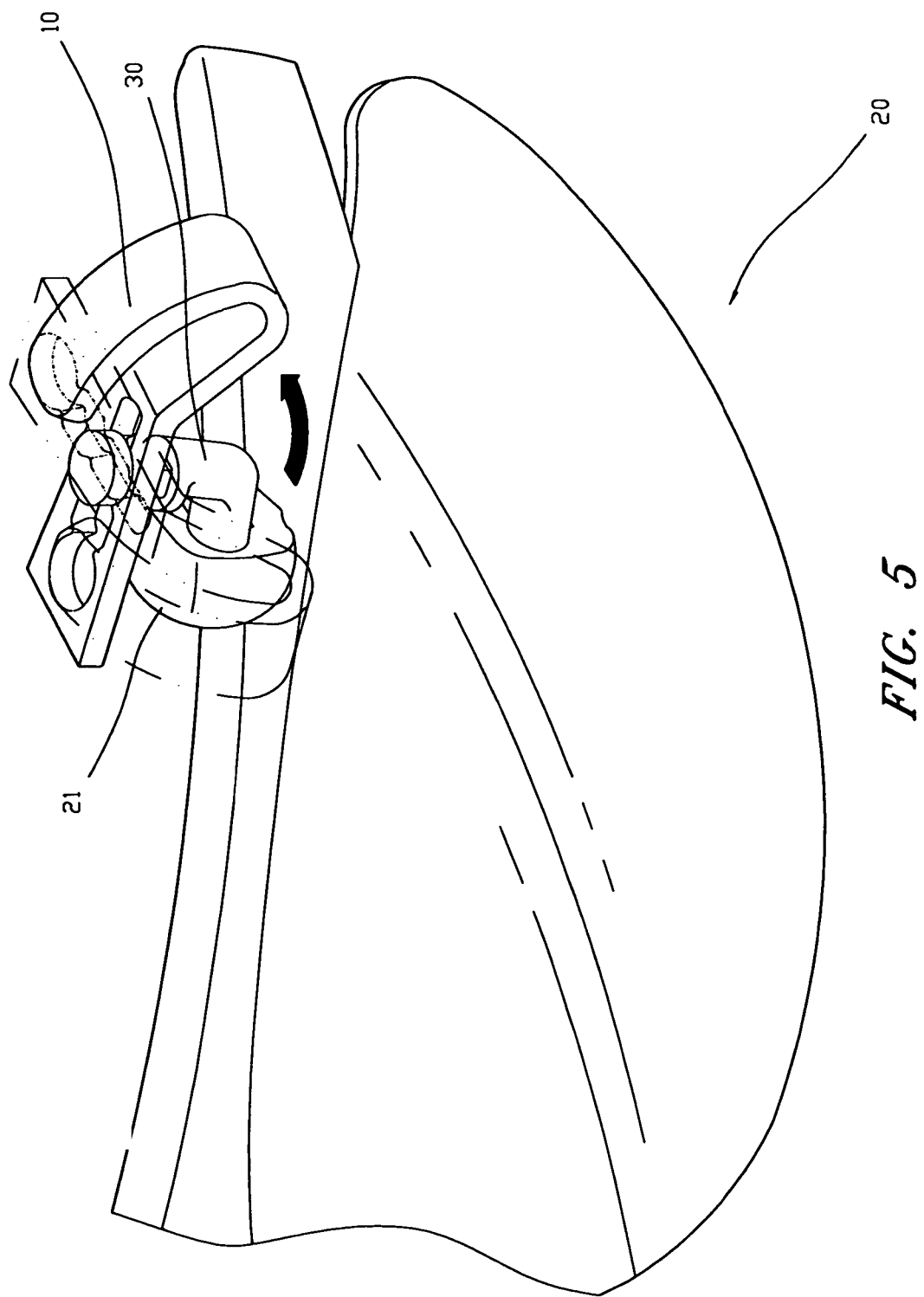

The joint member 30 has an L-like shape with a spherical element 31 at one end and a bolt element 32 at the other end. The glasses member 20 has two seat elements 21 at appropriate locations on the top rim (not numbered) of the glasses member 20 that can receive the spherical elements 31 of the two joint members 30 respectively. The joint members 30 are therefore attached to and held by the glasses member 20. The seat elements 21 and the spherical elements 31 are provided such that the joint members 30 can rotate relatively to their spherical elements while attached to said seat element 21. Each clipping member 10 is a strip having one end bended to form a hook portion (not number) and a flat portion (not numbered) at the other end. A slot opening 11 is provided on the flat portion. The slot opening 11 and an indented neck portion (not numbered) on the bolt element 32 jointly form a positioning mechanism for the adjustment of the extension of the clipping member 10 from the glasses member 20 so as to fit brims 41 of various sizes. The neck portion of the bolt element 32 is a rectangular column. On the other hand, the slot opening 11 has a particular shape which allows the bolt element 32 to penetrate through at a particular entry location but the rest of the slot opening 11 allows only the narrow side of the neck portion to slide through. As shown in FIG. 4, the bolt element 32 (FIG. 6) is first threaded through the clipping member 10 so that the neck portion is inside the slot opening 11. Then, the narrow side of the neck portion is aligned with the slot opening 11 by rotating the clipping member 10 with ninety degree clockwise. The clipping member 10 then can be slid until the neck portion is at an appropriate location inside the slot opening 11. The clipping member 10 then is rotated for about 90 degrees, as shown in FIG. 5, so that the slop opening 11 tightly squeeze the wider side of the neck portion. The clipping member 10 is therefore securely positioned. Due to the positioning mechanism, the pair of sun glasses can have its clipping members 10 adjusted to fit on various kinds of caps 40 whose brims 41 are of significantly different sizes.

Figure 6:
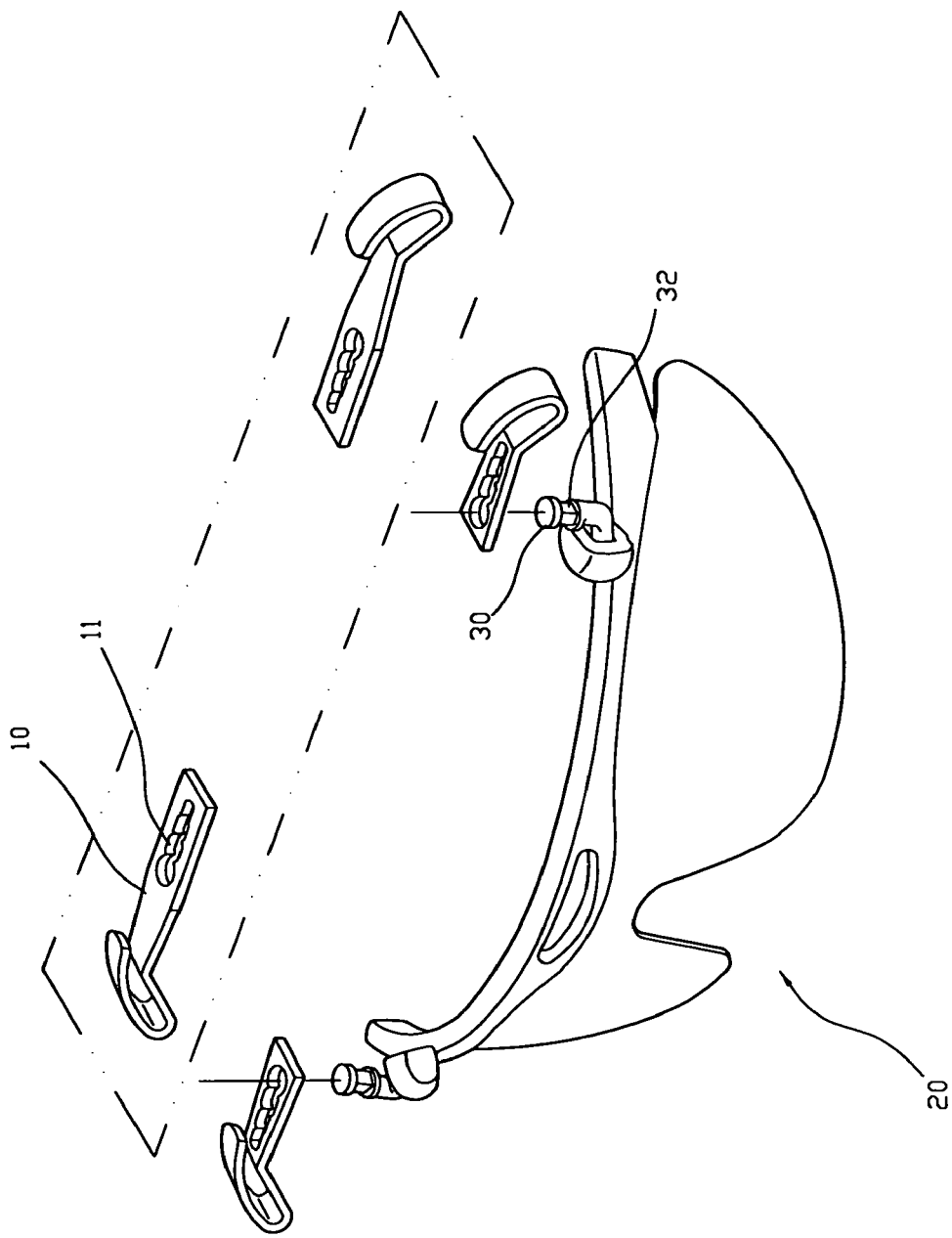
FIG. 6 is a perspective view showing two styles of slot openings of the clipping member of FIG. 1.
Figure 7:
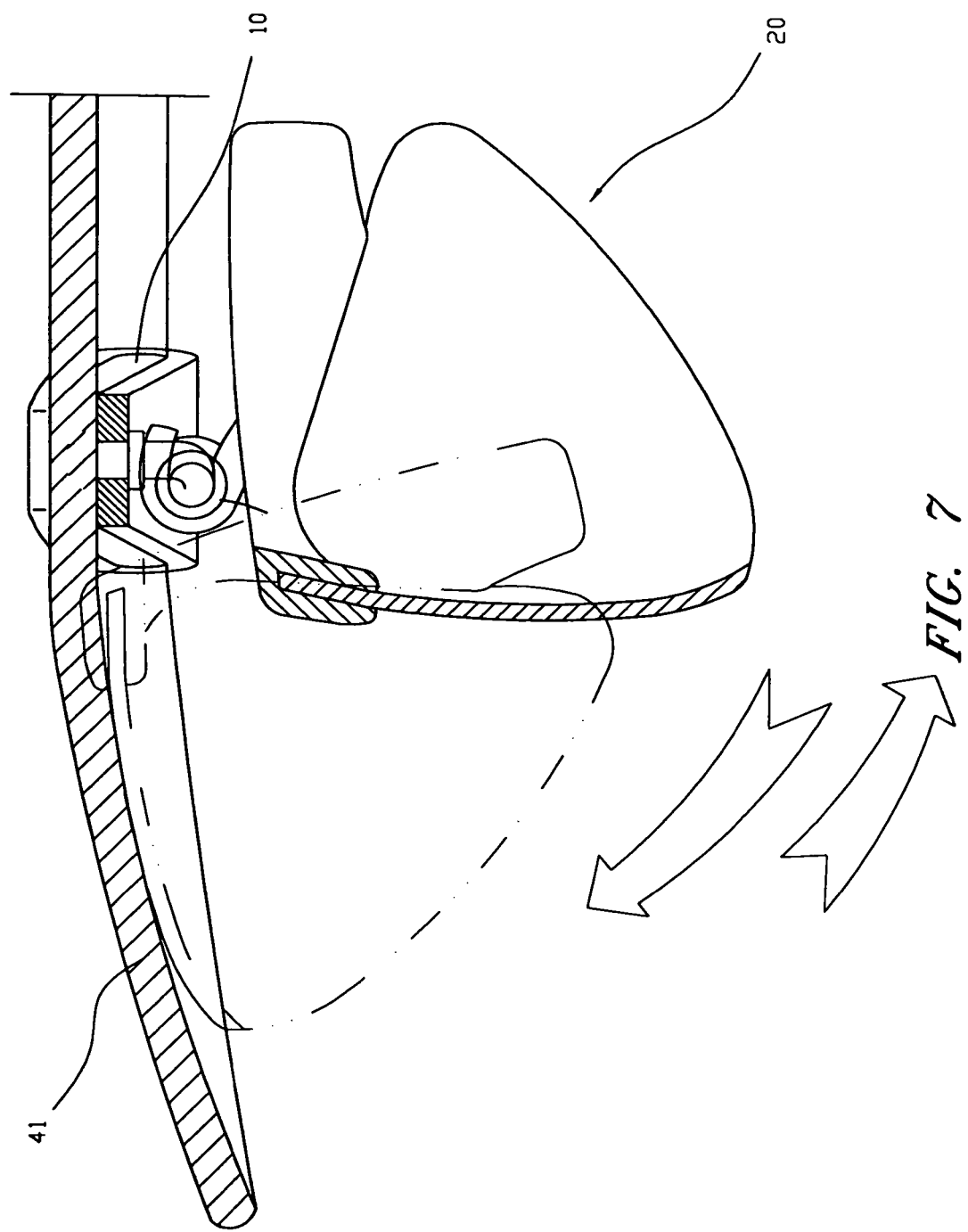
FIG. 7 is a profile view showing the flipping the glasses member of FIG. 1.

To mount the sun glasses on the cap 40, the clipping members 10 are adjusted first to match the width of the brim 41. The pair of sun glasses is then attached to the cap 40 by having the hook portions of the clipping members 10 to clip the edge of the brim 41 from two sides. As shown in FIG. 6, the slot opening 11 can have two styles. One is to have the entry location of the bolt element 32 closer to the outer end of the flat portion of the clipping member 10. The clipping member 10 is therefore extended by shifting outwards. The other style is to have the entry location of the bolt element 32 closer to the middle of the clipping member 10. The clipping member 10 is therefore withdrawn by shifting inwards. The former is more suitable for caps with wider brims; the latter is more suitable for caps with narrower brims. In addition, as the joint members 30 can rotate relative to the spherical elements 31 housed in the seat elements 21, as shown in FIG. 7, the glasses member 20 can be flipped upward towards the brim 41 when the lighting condition is mild, or can be flipped downward towards the user's face when the light is too bright.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pair of sun glasses mounted on the brim of a cap, said pair of sun glasses comprising:

a glasses member having two seat elements on the top rim of said glasses members;

two joint members, each having an L-like shape with a spherical element at one end and a bolt element at the other end, said bolt element having an indented neck portion which has at least a wider side and a narrow side; and two clipping members, each being a strip having one end bended to form a hook portion for clipping the edge of the brim of said cap and a flat portion at the other end, said flat portion having a slot opening of a particular shape;

wherein each joint member is attached to said glasses member by having its spherical element fitted inside said seat element; said seat elements and said spherical elements are provided such that said joint member is able to rotate around said spherical element while attached to said seat element; said shape of said slot opening allows said bolt element to penetrate through at a particular location but the rest of said slot opening allows only said narrow side of said neck portion to slide through; said clipping members are therefore extended for an appropriate distance from said glasses member by sliding said clipping members with said bolt elements inside said slot openings; said clipping member is rotated for an appropriate angle to reliably clip said wider side of said neck portion; and said hook portions of said clipping members clip the edge of the brim of said cap, thereby mounting said pair of sun glasses below said cap.

2. The pair of sun glasses according to claim 1, wherein said glasses member is capable of being flipped around said seat elements upward towards the brim and downward towards the face of a user wearing said cap.

3. The pair of sun glasses according to claim 1, wherein said slot opening has one of the following two styles: the entry location of said bolt element is closer to the outer end of said flat portion of said clipping member; and the entry location of said bolt element is closer to the middle of said clipping member.

* * * * *